(12) United States Patent
Michaud

(10) Patent No.: US 6,186,728 B1
(45) Date of Patent: Feb. 13, 2001

(54) LIFT TRUCK

(76) Inventor: Rino Michaud, 1263 Georges, Saint-Hubert, Quebec (CA), J4T 1V5

(*) Notice: Under 35 U.S.C. 154(b), the term of this patent shall be extended for 0 days.

(21) Appl. No.: 09/413,363

(22) Filed: Oct. 6, 1999

(51) Int. Cl.⁷ ............... B60P 1/02; B60P 1/64; B62B 3/06; B66F 9/065
(52) U.S. Cl. ............... 414/458; 414/498; 414/509; 414/664; 414/917; 254/10 R; 254/8 C; 280/47.34
(58) Field of Search ............... 414/450, 451, 414/458, 459, 495, 498, 507, 509, 510, 539, 546, 555, 589, 662, 663, 664, 917; 254/8 R, 10 R, 10 C, 8 C; 280/43.12, 43.17, 43.22, 47.34, 47.35; 187/222

(56) References Cited

U.S. PATENT DOCUMENTS

| | | | | |
|---|---|---|---|---|
| 2,477,871 | * | 8/1949 | Grogan et al. | 414/458 X |
| 2,822,944 | * | 2/1958 | Blomgren | 414/458 |
| 3,290,051 | * | 12/1966 | O'Brien et al. | 414/458 X |
| 3,547,288 | * | 12/1970 | Butler | 414/458 X |
| 5,449,266 | * | 9/1995 | Evans | 414/458 |
| 5,879,122 | * | 3/1999 | Voelzke | 414/458 |

* cited by examiner

*Primary Examiner*—Robert P. Olszewski
*Assistant Examiner*—Gerald J. O'Connor
(74) *Attorney, Agent, or Firm*—Eric Fincham

(57) ABSTRACT

A lift truck for use with containers of the type used as a shipping bin and display bin, the lift truck having a lower frame mounted on wheels, an upper frame, a plurality of linking arms extending between the lower frame and upper frame with each of the linking arms being pivotably connected to both the upper and lower frames, each of the upper and lower frames having first and second longitudinally extending frame members, a handle pivotably connected to the lower frame member, the arrangement being such that in a first lower position the linking arms permit the upper frame to be adjacent the lower frame to move into position to receive the container or bin, while a movement of the handle causes the upper frame to move upwardly and be spaced from the lower frame by the linking arms such that the container is lifted upwardly.

4 Claims, 4 Drawing Sheets

LIFT TRUCK

The present invention relates to a lift truck and more particularly, relates to a lift truck to be used with containers in a warehouse environment.

BACKGROUND OF THE INVENTION

Increasingly, in order to achieve greater efficiency, retail outlets are receiving certain types of goods packaged loose in a container. The idea is that these goods, which are not suitable for conventional display on a rack or a shelf, may be displayed in the container in which they are shipped. The idea is to minimize the amount of handling such goods have to undergo and thereby reduce overhead.

In the art, various types of lift dollies and the like have been proposed. However, none of these are suitable for the new class of container in which the goods are shipped.

SUMMARY OF THE INVENTION

It is therefore an object of the present invention to provide a lift truck which is suitable for moving and lifting bulk containers of a type having a lip extending outwardly from a top marginal edge of the container, and which lip has an aperture formed therein.

According to one aspect of the present invention, there is provided a lift truck suitable for use with a container having a rectangular body with a pair of side walls, each of the side walls having an outwardly extending flange with at least one aperture formed in each of the flanges, the lift truck comprising a lower frame mounted on wheels, the lower frame having first and second longitudinally extending lower frame members, a lower transverse frame structure extending between the first and second longitudinally extending lower frame members, an upper frame, the upper frame having first and second longitudinally extending upper frame members, an upper transversely extending upper frame structure extending between the first and second longitudinally extending upper frame members, a plurality of linking arms extending between the first lower frame member and the first upper frame member and between the second lower frame member and the second upper frame member, each of the linking arms being pivotably connected to both upper and lower frame members, a handle pivotably connected to the lower frame member, with linking members extending between the handle and the upper frame, the arrangement being such that in a first lowered position, the linking arms permit the upper frame to lie adjacent the lower frame while in a second position, the upper frame member is spaced from the lower frame member by the linking arms and supported thereby, the linking arms being angled with respect to the vertical when in the second position, each of the first and second longitudinally extending upper frame members having an upwardly extending pin member formed thereon, the upwardly extending pin member being located proximate a distal end of each of the longitudinally extending upper frame members.

The lift truck according to the present invention, as aforementioned, has both an upper transverse frame structure and a lower transverse frame structure. Preferably, both the upper and lower transverse frame structures are adjustable in overall length to thereby adjust the width of the lift truck to accommodate different standard size containers.

Although many different methods may be utilized for adjusting the width, a simple and inexpensive method would comprise using a telescoping arrangement wherein various preset widths may be arrived at using pins fitting within apertures to lock the transverse frame members together.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
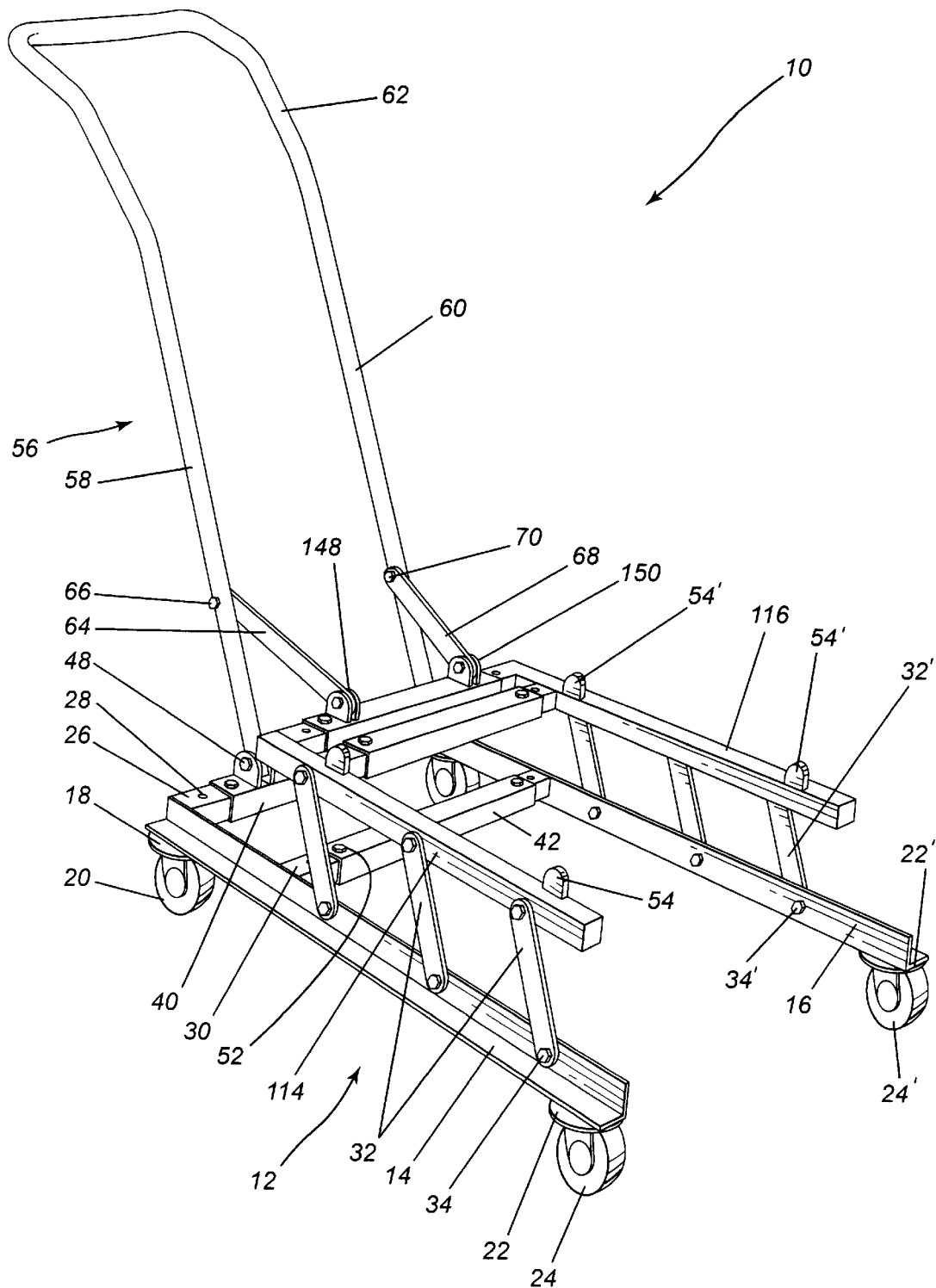
FIG. 1 is a perspective view of a lift truck according to the present invention.
Figure 2:
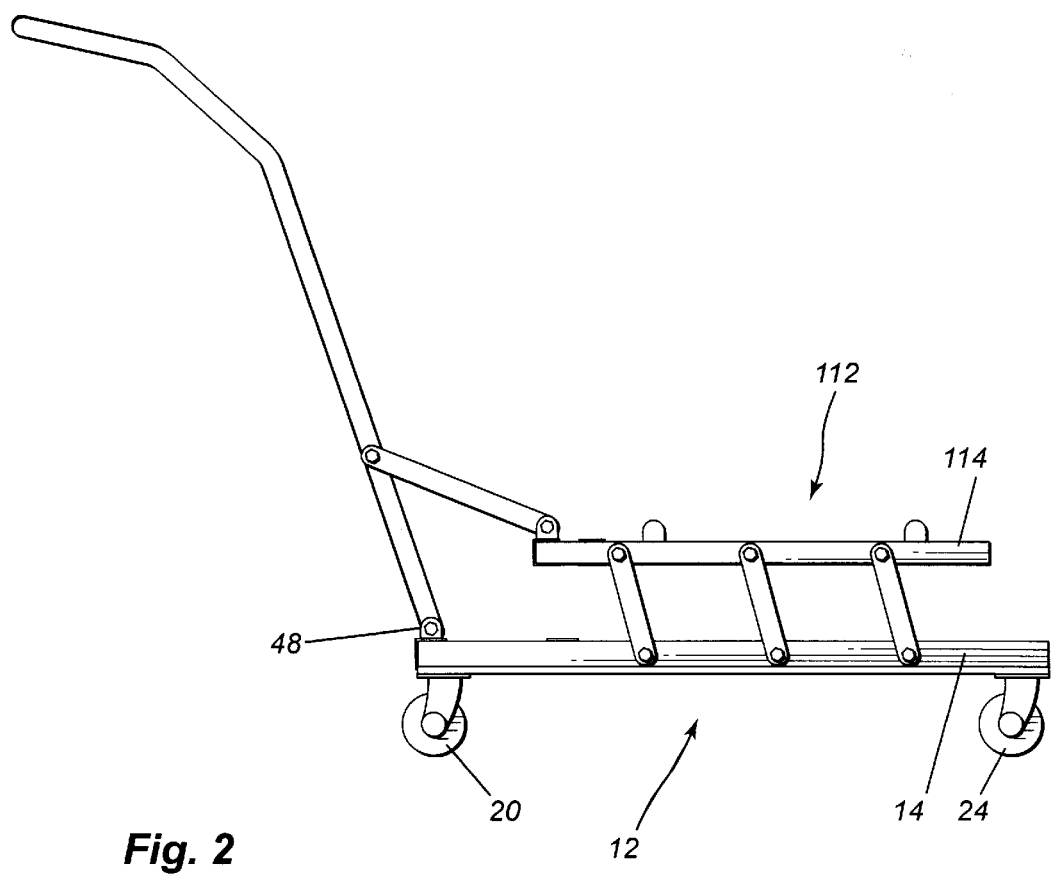
FIG. 2 is a side elevational view of the lift truck when in a raised position.
Figure 3:
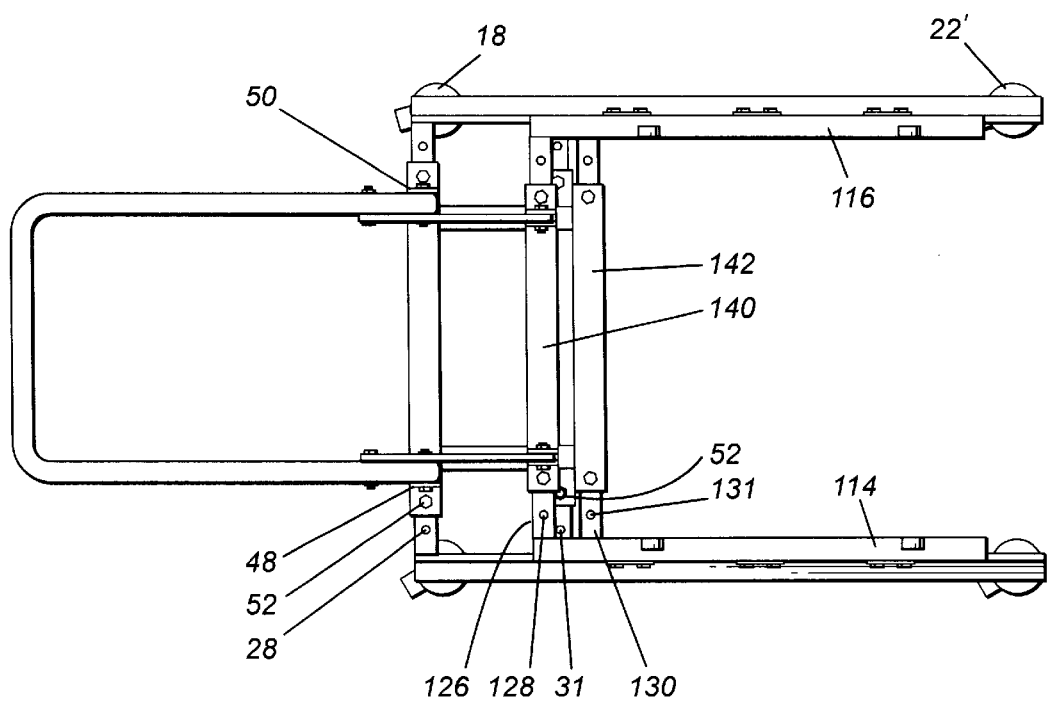
FIG. 3 is a top plan view thereof.

Referring to the drawings in greater detail and by reference characters thereto, there is illustrated in FIG. 1, in a perspective view, a lift truck which is generally designated by reference numeral 10.

Lift truck 10 has a lower frame generally designated by reference numeral 12 and which will now be described. Lower frame 12 is comprised of a first longitudinally extending frame member 14 and a parallel second longitudinally extending frame member 16.

First longitudinally extending frame member 14 has, at one end thereof, a bracket 18 which is mounted on a lower portion there of and which has a wheel 20 mounted therein. A similar arrangement is provided at the other end of second longitudinally extending frame member 16 wherein there is provided a bracket 22 and a wheel 24.

At one end of first longitudinally extending frame member 14 there are provided a first stud 26 having apertures 28 formed in an upper surface thereof and a second stud 30 having apertures 31 located therein.

A plurality of linking arms 32 are connected to first longitudinally extending frame member 14 at a lower pivot point 34.

A lower transverse frame structure includes an inner crossbar 40 and a parallel outer crossbar 42.

Mounted on an upper surface of inner crossbar 40 are a first set of ears 48 and a second set of ears 50. It will also be noted that both inner crossbar 40 and outer crossbar 42 have apertures 52 formed in an upper surface thereof at their extremities.

Second longitudinally extending frame member 16 is a substantial mirror image of first longitudinally extending frame member 14 and thus, similar reference numerals with a prime are used for similar components. Thus, second longitudinally extending frame member 16 includes brackets 18' and 22' for mounting wheels 20' and 24' respectively. Studs 26' and 30' have apertures 28' and 31' while linking arms 32' are connected to second longitudinally extending frame member 16 at lower pivot point 34'.

The lift truck of the present invention also includes an upper frame which is similar to the lower frame and similar reference numerals in the 100s are used to designate like components. Thus, upper frame 112 is comprised of a first upper longitudinally extending frame member 114 and a parallel second upper longitudinally extending frame member 116.

In a manner similar to the lower frame arrangement, there is a first stud 126 having apertures 128 in an upper surface and a second stud 130 having apertures 131 formed therein.

There is also provided an upper transverse frame structure 138 which has an inner crossbar 140 and an outer crossbar 142 with first and second sets of ears 148 and 150.

A pair of upwardly extending pin members 54 are provided on first upper longitudinally extending frame member 114; likewise, upwardly extending pin members 54' are provided on second upper longitudinally extending frame member 116.

The lift truck further includes a handle member generally designated by reference numeral 56 which is comprised of a pair of arms 58 and 60 and a U-shaped upper portion 62. Secured to arm 58 is a first linking arm 64 which is attached at one end to pivot point 66 and at the other end to ears 148 while a second linking arm 68 is secured to arm 60 at pivot point 70 and also to ears 150. Arms 58 and 60 are pivotably connected to ears 48 and 50 respectively.

Linking arms 32, as aforementioned, are pivotally connected at pivot point 34 to first lower longitudinally extending frame member 114. They are likewise pivotably attached at pivot point 35 to first upper longitudinally extending frame member 114. A similar arrangement is employed on the other side with linking arms 32'.

Figure 4:
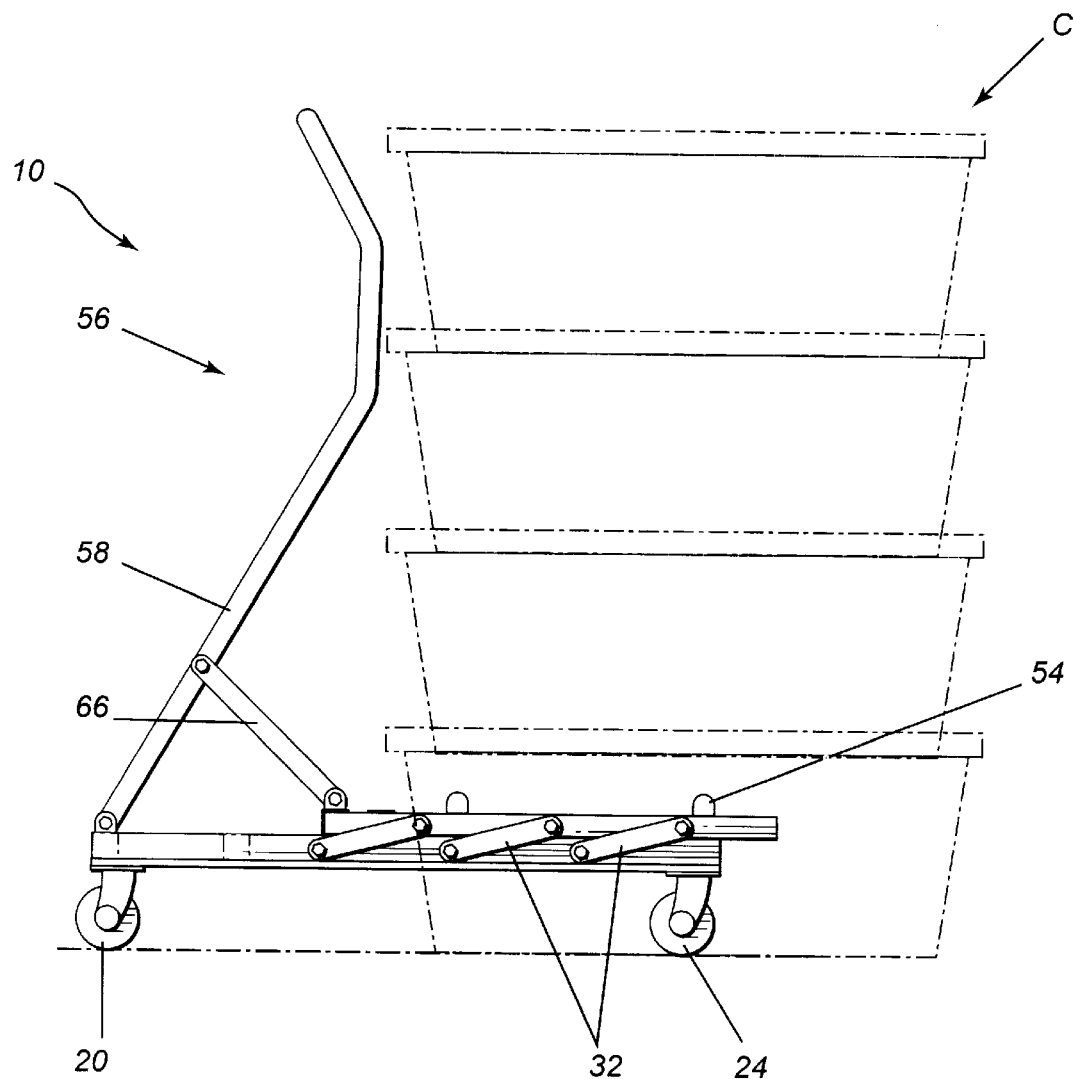
FIG. 4 is a side plan view illustrating the use of the lift truck when in a lowered position to be placed in position to lift a plurality of containers.
Figure 5:
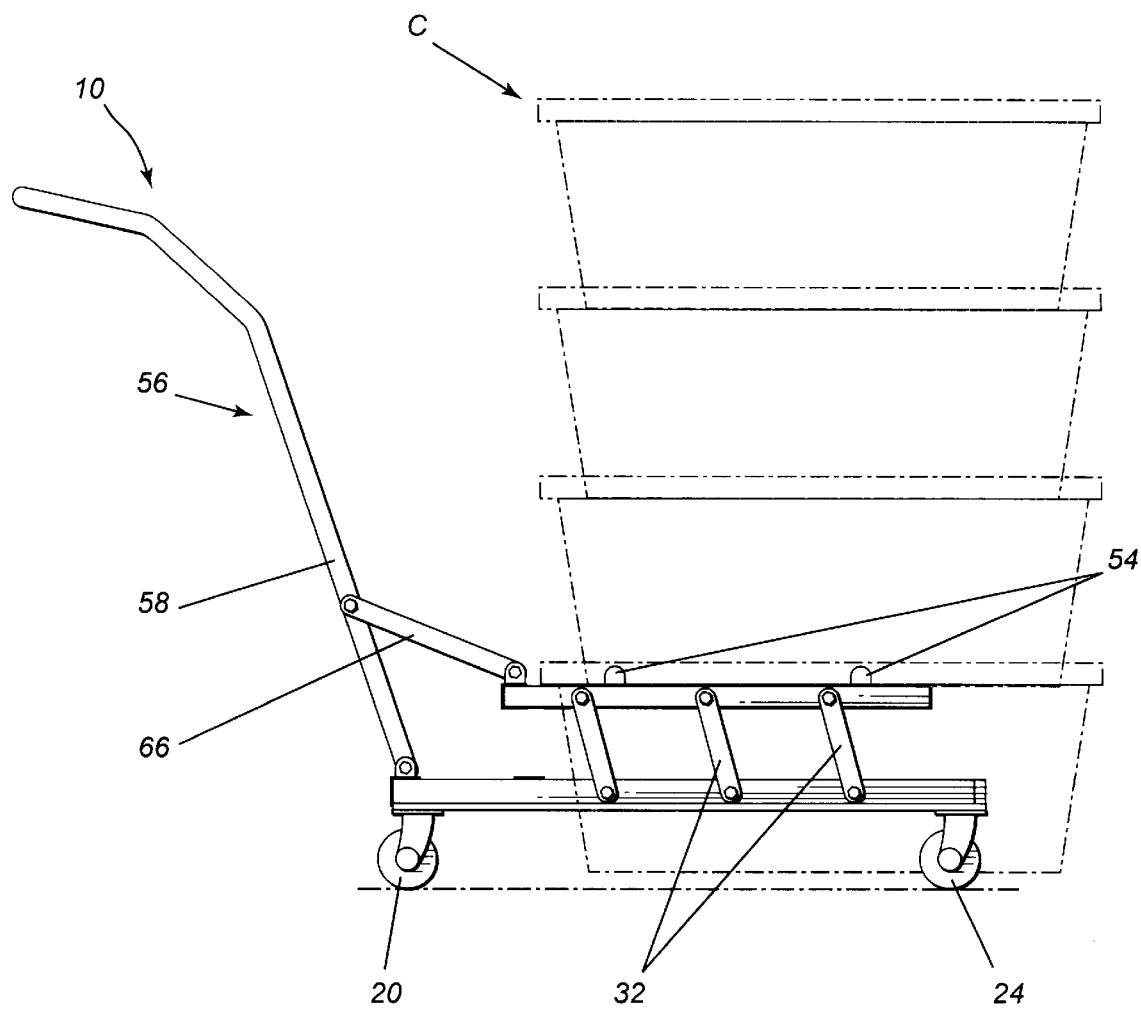
FIG. 5 is a view similar to FIG. 4 showing the lifting of the containers.

As shown in FIG. 4, lift truck 10 is first moved into position with upper frame 112 being lowered to lie in juxtaposition to lower frame 12. When in position, handle 56 is pulled rearwardly and through linking arms 66, 68; upper frame 112 also moves upwardly and rearwardly. Upwardly extending pin members 54 engage in apertures within the side flanges of container C while the rear flange rests on transverse crossbar 142. Thus, the container is supported both along the sides and at the rear.

In a raised position, it will be noted that linking arms 32 and 32' are angled with respect to the vertical. The weight of the containers acting downwardly prevents linking arms 32 from moving forwardly back to the original position.

It will be understood that the above described embodiment is for purposes of illustration only and that changes and modifications may be made thereto without departing from the spirit and scope of the invention.

I claim:

1. A hand operated lift truck comprising:
   a lower frame, said lower frame being mounted on wheels, said lower frame having first and second longitudinally extending lower frame members, a lower transverse frame structure extending between said first and second longitudinally extending lower frame members;
   an upper frame, said upper frame having first and second longitudinally extending upper frame members, an upper transversely extending upper frame structure extending between said first and second longitudinally extending upper frame members;
   an upwardly extending pin member on each of said upper longitudinally extending members, said upwardly extending pin member being located proximate a distal end of each of said longitudinally extending upper frame members;
   a plurality of linking arms extending between said first lower frame member and said first upper frame member and between said second lower frame member and said second upper frame member, each of said linking arms being pivotably connected to both said upper and lower frame members;
   a handle pivotably connected to said lower transverse frame structure, and linking members extending between said handle and said upper frame, said handle being moveable between forward and rearward positions, the arrangement being such that when said handle is moved forwardly toward said upper frame, said linking arms permit said upper frame to lie adjacent said lower frame while when said handle is in a rearward position, said upper frame is spaced from said lower frame by said linking arms and supported thereby, said linking arms being angled with respect to the vertical to thereby lock said upper frame in said second position.

2. The lift truck of claim 1 wherein said upper transverse frame structure and said lower transverse frame structure are adjustably connected to said upper frame members and said lower frame members respectively.

3. The lift truck of claim 2 wherein said upper transverse frame and said lower transverse frame and said lower and upper frame members are connected together by a plurality of pins, each of said members having apertures extending therethrough to permit a varying location of said pins and a varying width of said lift truck.

4. A hand operated lift truck consisting essentially of:
   a lower frame, said lower frame being mounted on wheels, said lower frame having first and second longitudinally extending lower frame members, a lower transverse frame structure extending between said first and second longitudinally extending lower frame members;
   an upper frame, said upper frame having first and second longitudinally extending upper frame members, an upper transversely extending upper frame structure extending between said first and second longitudinally extending upper frame members;
   an upwardly extending pin member on each of said upper longitudinally extending members, said upwardly extending pin member being located proximate a distal end of each of said longitudinally extending upper frame members;
   a plurality of linking arms extending between said first lower frame member and said first upper frame member and between said second lower frame member and said second upper frame member, each of said linking arms being pivotably connected to both said upper and lower frame members;
   a handle pivotably connected to said lower transverse frame structure, and linking members extending between said handle and said upper frame, said handle being moveable between forward and rearward positions, the arrangement being such that when said handle is moved forwardly toward said upper frame, said linking arms permit said upper frame to lie adjacent said lower frame while when said handle is in a rearward position, said upper frame is spaced from said lower frame by said linking arms and supported thereby, said linking arms being angled with respect to the vertical to thereby lock said upper frame in said second position.

* * * * *